United States Patent
Drager

(10) Patent No.: US 7,770,526 B2
(45) Date of Patent: Aug. 10, 2010

(54) RAILCAR MAN-WAY COVER LIFT-ASSIST SYSTEM

(75) Inventor: Barry Drager, Houston, TX (US)

(73) Assignee: Draco Spring Mfg. Co., Inc, Houston, TX (US)

(*) Notice: Subject to any disclaimer, the term of this patent is extended or adjusted under 35 U.S.C. 154(b) by 5 days.

(21) Appl. No.: 12/263,783

(22) Filed: Nov. 3, 2008

(65) Prior Publication Data

US 2010/0107926 A1    May 6, 2010

(51) Int. Cl.
*B61D 39/00* (2006.01)

(52) U.S. Cl. ............................ 105/377.07; 105/377.05; 220/835

(58) Field of Classification Search ............ 105/377.07, 105/377.05; 220/835; 411/44, 265, 268, 411/253, 270; 114/201 R; 296/100.06, 100.1
See application file for complete search history.

(56) References Cited

U.S. PATENT DOCUMENTS

| | | | | |
|---|---|---|---|---|
| 4,127,216 A | * | 11/1978 | Martin et al. | 220/374 |
| 4,248,160 A | * | 2/1981 | Carney et al. | 105/377.11 |
| 4,398,649 A | | 8/1983 | Labbe | |
| 4,655,365 A | * | 4/1987 | Miller | 220/314 |
| 4,819,830 A | * | 4/1989 | Schultz | 220/371 |
| 4,865,513 A | * | 9/1989 | Norris | 414/684.3 |
| 4,889,056 A | * | 12/1989 | Stewart | 105/377.11 |
| 4,941,695 A | * | 7/1990 | Miller | 292/256.5 |
| 5,112,097 A | * | 5/1992 | Turner, Jr. | 296/100.12 |
| 5,158,022 A | * | 10/1992 | Dugge et al. | 105/377.07 |
| 5,394,650 A | * | 3/1995 | Dean | 49/386 |
| 5,425,466 A | | 6/1995 | Bambacigno | |
| 5,644,990 A | * | 7/1997 | Seitz | 105/377.07 |
| 5,690,141 A | * | 11/1997 | Creaghe | 137/382 |
| 6,076,471 A | * | 6/2000 | Burian et al. | 105/377.07 |
| 6,095,365 A | * | 8/2000 | Yielding | 220/264 |
| 6,390,119 B1 | | 5/2002 | Crochet et al. | |
| 6,494,338 B1 | * | 12/2002 | Schultz | 220/328 |
| 6,505,563 B2 | * | 1/2003 | Shaddle | 105/377.07 |
| 6,533,935 B2 | * | 3/2003 | Miller et al. | 210/248 |
| 6,595,716 B1 | * | 7/2003 | VanDeVyvere et al. | 404/26 |
| 6,824,140 B2 | * | 11/2004 | Frew et al. | 277/637 |
| 6,929,142 B2 | * | 8/2005 | Gilbert et al. | 220/216 |
| 7,131,455 B2 | * | 11/2006 | Horban et al. | 137/350 |
| 7,427,089 B2 | * | 9/2008 | Silverio et al. | 292/256.5 |
| 2005/0205576 A1 | * | 9/2005 | Bednara et al. | 220/328 |
| 2007/0235463 A1 | * | 10/2007 | Wyler | 220/835 |
| 2008/0035808 A1 | * | 2/2008 | Rawlings et al. | 248/176.1 |
| 2009/0158959 A1 | * | 6/2009 | Schultz et al. | 105/377.07 |

* cited by examiner

*Primary Examiner*—S. Joseph Morano
*Assistant Examiner*—Jason C Smith
(74) *Attorney, Agent, or Firm*—Law Office of Tim Cook P.C.

(57) ABSTRACT

A lift-assist system for a man-way cover includes a unitary spring mounted to the axis of rotation for the man-way cover. The spring includes a coil portion on either side of the axle of rotation, with a unitary bridge portion spanning between the coil portions. The bridge portion of the spring presses down on a cantilevered extension of the man-way cover, called a duck bill. A first predetermined spacing is provided between the coil portions and the axle and second predetermined spacing is provided between the ends of the coil portions and the mounting of the axle. These predetermined spacings accommodate the variations in the coil geometry as the man-way cover moves from a fully shut position to a fully open position and vice versa.

8 Claims, 3 Drawing Sheets

RAILCAR MAN-WAY COVER LIFT-ASSIST SYSTEM

FIELD OF THE INVENTION

The present invention relates generally to the field of railcar man-way covers and, more particularly, to a biasing system to assist in the movement of such a man-way cover.

BACKGROUND OF THE INVENTION

Railroad tanker cars commonly transport various fungible materials, particularly various kinds of liquids. These types of tanker cars are typically provided with one or more access covers to seal off the tank, while providing entry into the interior of the tank for cleaning and inspection when desired. The access cover is mounted for rotary motion to bring a seal ring into abutting contact with a coaming extending upward from a saddle in order to seal the access cover.

A typical access (man-way) cover is formed of cast metal and often weighs over one hundred pounds. A lift handle is provided, integrally formed with the cover, on the edge of the cover opposite the pivot point for the cover, to provide the greatest mechanical advantage for the one doing the lifting. Even with this mechanical advantage, the cover is quite heavy and may cause injury to the one doing the lifting. For this reason, federal regulations require that the force needed to lift such an access cover be no more than 50 pounds.

Various schemes have been used in the past to assist the operator in lifting the access cover. With the regulations referred to above in force, the need for an improved lifting arrangement is even more imperative. One common arrangement used in the past for a lift assist system included a pair of parallel springs slidingly coupled to a harness secured to the top of the cover. The distal ends of the parallel springs press against the underside of a lifting harness on the top of the man-way cover between the axle of rotation and the center of the cover. This arrangement is quite satisfactory for light man-way covers. However, when heavier gage man-way covers were introduced, this arrangement either had to be re-engineered or scrapped entirely.

Thus, there remains a need for a lift-assist system that provide enough biasing on an access cover that no more than fifty pounds is needed to lift the access cover. Also, since there are literally thousands of tanker cars with access covers on the rails today, the lift-assist system should be capable of retrofit onto existing access covers. The system should be robust and last as long as or longer than existing systems. The present invention is directed to filling this need in the art.

SUMMARY OF THE INVENTION

In order to achieve these and other advantages over the art a unitary spring is mounted to the axis of rotation for the man-way cover. In a first aspect, the present invention comprises a unitary spring as applied to a man-way cover. In a second aspect, the present invention comprises a man-way cover with a unitary biasing spring. The spring includes a coil portion on either side of the axle of rotation, with a unitary portion spanning between the coil portions. The unitary spanning portion of the spring presses down on a cantilevered extension of the man-way cover, referred to colloquially as a "duck bill". A first predetermined spacing is provided between the coil portions and the axle and second predetermined spacing is provided between the ends of the coil portions and the mounting of the axle. These predetermined spacings accommodate the variations in the coil geometry as the man-way cover moves from a fully shut position to a fully open position.

These and other features and advantages of this invention will be readily apparent to those skilled in the art.

BRIEF DESCRIPTION OF THE DRAWINGS

So that the manner in which the above recited features, advantages and objects of the present invention are attained and can be understood in detail, more particular description of the invention, briefly summarized above, may be had by reference to embodiments thereof which are illustrated in the appended drawings.

DETAILED DESCRIPTION OF PREFERRED EMBODIMENTS

Figure 1:
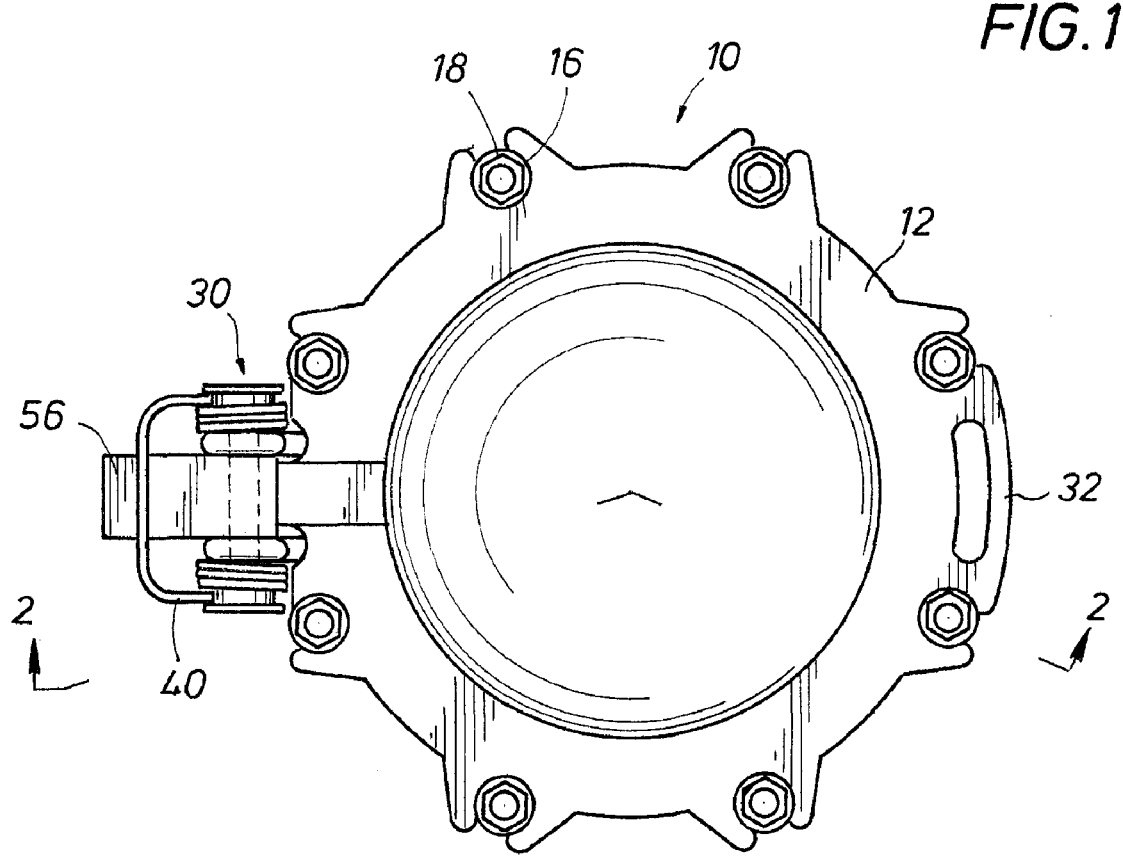
FIG. 1 is a top view of a man-way cover with a unitary biasing spring.
Figure 2:
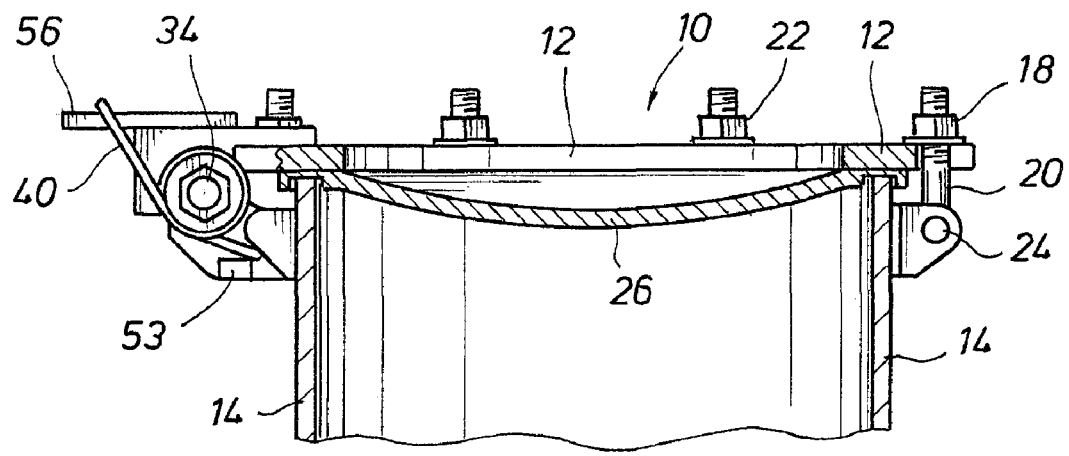
FIG. 2 is a side view of the man-way cover and spring combination in partial section as shown along sight lines 2-2 of FIG. 1, shown in a shut position.
Figure 3:
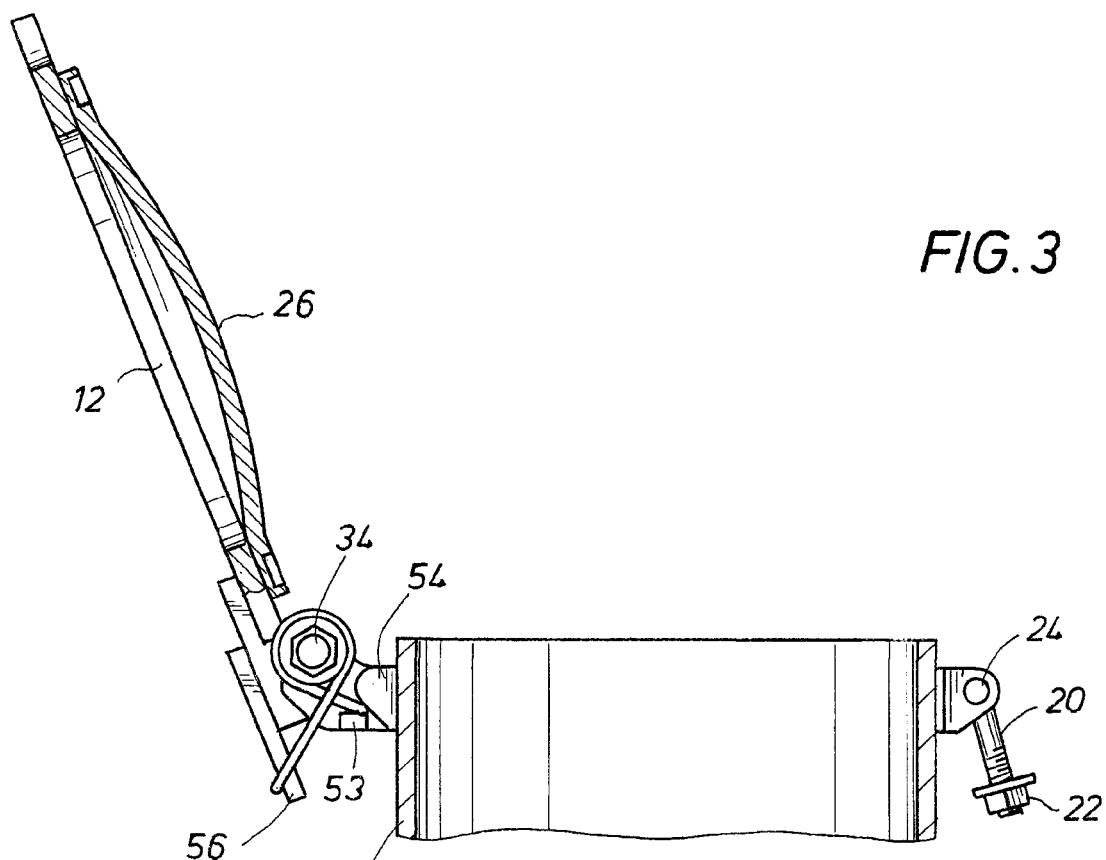
FIG. 3 is a side view of the man-way cover and spring combination in partial section, shown in an open position
Figure 4:
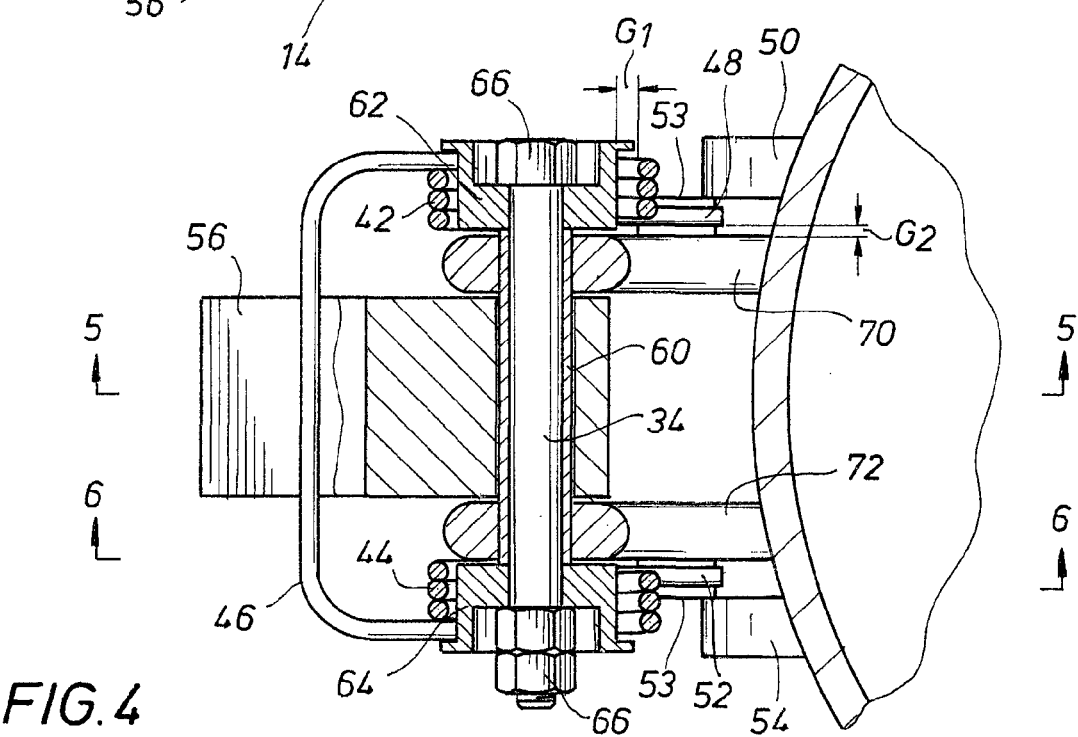
FIG. 4 is a detail view of the mounting of the spring on a man-way cover.

FIGS. 1 and 2 illustrate a presently preferred embodiment of a man-way cover 10 constructed in accordance with the present invention. The cover 10 primarily comprises a substantially flat lid 12 arranged to fit into abutting, sealing engagement with a combing 14. The combing 14 extends vertically from a railway car (not shown) in the conventional matter, permitting access into the interior space of the railway car. The lid 12 includes a plurality of outwardly extending forks 16, each of which is arranged to receive a dog 18. Each dog 18 includes a threaded bolt member 20 which receives a nut 22. The dog 18 is rotationally mounted to an axle 24 so that, when the nut is backed off the bolt, the dog can be rotated out of the way, permitting the man-way cover to be lifted, as shown in FIG. 3. A seal member 26 is included on the underside of the lid 12.

The cover 10 includes a lift-assist system 30, described below in greater detail. Opposite the lift-assist system, a handle 32 is integrally formed with the lid and is provided to give the operator a readily accessible means of lifting the man-way cover. By grasping the handle 32, an operator lifts the cover by rotating the lid 12 about a lift axle 34.

In a known lift-assist system for this type of man-way cover, a pair of opposed springs are mounted on the lift axle, with an ends of the springs running through a yoke mounted at or near the center of the lid 12. This configuration has the advantage of long-time acceptance in the industry, so that many replacement parts are readily available. However, such a system is very inefficient since much of the lift energy is wasted through friction in the yoke, and a very heavy pair of springs is required to act through such a long moment arm. The lift-system of this invention addresses these drawbacks.

The lift-assist system 30 includes a unitary spring 40 mounted about the lift axle 34. The unitary spring 40 comprises a first coil 42 and a second coil 44, joined together with a bridge member 46. The first coil 42 includes an extension 48 for abutting engagement with a torque ledge 53 near a mounting pedestal 50. Similarly, the second coil 44 includes an extension 52 for abutting engagement with a torque ledge 53 near a mounting pedestal 54. The bridge member 46 abuts a cantilevered lift platform 56, referred to as a duck bill, so that the biasing force of the unitary spring 40 tends to assist in opening the cover. Thus, the cantilevered lift platform extends beyond the lift axle 34 opposite the lid 12, thereby defining a first class lever.

For assembly, the lift-assist system 30 includes a sleeve 60 that is co-axial with the lift axle 34. A first grommet 62 and a second grommet 64 are placed on either end of the sleeve 60, and the assembly is then secured with a pair of opposing nuts 66.

The unitary spring 40 includes a pair of gap specifications, $G_1$ and $G_2$. The gap $G_1$ defines a gap between the spring coil 42 and the grommet 62. As the lid is placed down onto the combing 14, the spring is tightened, i.e. the diameter of the coil 42 is reduced. Thus, the gap $G_1$ prevents the coil 42 from contacting the outer diameter of the grommet 62. Such contact may cause the spring to bind. A similar gap specification is included for the coil 44. The second gap $G_2$ defines a gap between the coil 42 as a mounting support bracket 70. As the lid is placed down onto the combing 14, the spring is tightened, i.e. the length of the coil 42 is increased. Thus, the gap $G_2$ prevents the coil 42 from contacting the outer face of the mounting support bracket 70, which may also cause binding. A similar gap specification is again included for the coil 44.

Figure 5:
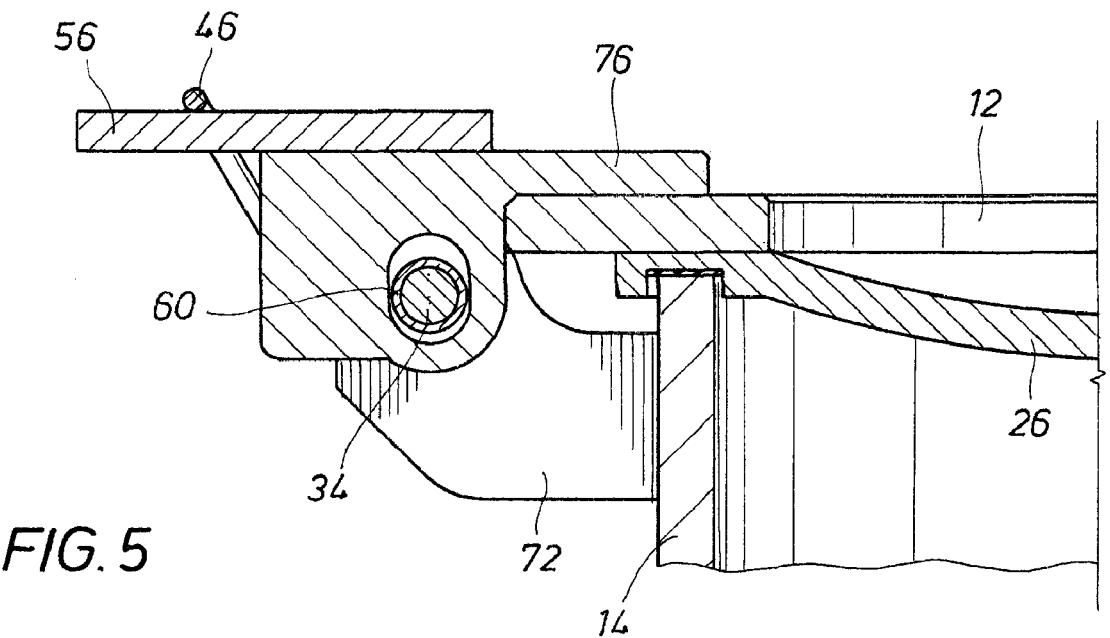
FIG. 5 is a detail view of the spring mount, seen along sight lines 5-5 of FIG. 4.
Figure 6:
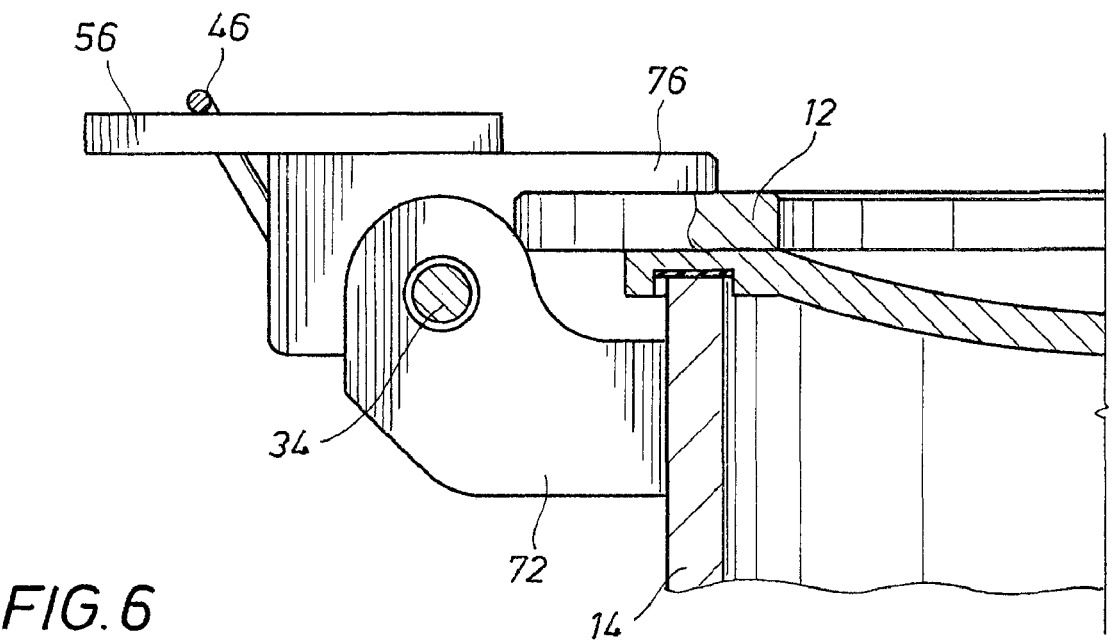
FIG. 6 is a detail view of the spring mount, seen along sight lines 6-6 of FIG. 4.

Finally, FIGS. 5 and 6 depicts the preferred mounting arrangement for the lift assist system. The duck bill 56 is secured to a mounting bracket 76, preferably by welding. The mounting bracket 76, in turn is secured to the lid 12, also preferably by welding. FIG. 6 illustrates that the axle 34 is secured to the mounting bracket 72, while FIG. 5 illustrates that the axle and sleeve are free to turn within an opening in the mounting bracket 76.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. On a man-way cover comprising a lid arranged to seal a manway having a center, the lid further arranged to rotate about a lift axle and a cantilevered lift platform extending radially outwardly of the lift axle opposite the center of the manway, the lift platform defining an upper surface, a lift-assist system for the man-way cover comprising a single spring having first and second coils around the lift axle and a bridge member integral with and joining the first and second coils, the bridge member in abutting contact with the upper surface of the cantilevered lift platform biasing the lid in a manner tending to assist in the lifting of the lid.

2. The lift-assist system of claim 1, wherein the lid of the cover is mounted to the lift axle by a mounting bracket, and further comprising a first predetermined gap between the spring and the mounting bracket.

3. The lift-assist system of claim 1, further comprising a sleeve and a pair opposing grommets between the unitary spring and the lift axle.

4. The lift-assist system of claim 3, further comprising a second predetermined gap between the spring and the pair of opposing grommets.

5. On a man-way cover comprising a lid having a center and arranged to rotated about a lift axle defining an inboard side toward the center of the lid and an outboard side radially outward from the center of the lid, the outboard side defining a cantilevered lift platform extending beyond the lift axle, a lift-assist system for the man-way cover comprising a single spring having first and second coils around the lift axle and a bridge member integrally formed with and joining the first and second coils, the bridge member in abutting contact with the cantilevered lift platform biasing the lift platform downwardly in a manner tending to assist in the lifting of the lid.

6. The lift-assist system of claim 5, wherein the lid of the cover is mounted to the lift axle by a mounting bracket, and further comprising a first predetermined gap between the spring and the mounting bracket.

7. The lift-assist system of claim 5, further comprising a sleeve and a pair opposing grommets between the unitary spring and the lift axle.

8. The lift-assist system of claim 7, further comprising a second predetermined gap between the spring and the pair of opposing grommets.

* * * * *